(12) United States Patent
Barber et al.

(10) Patent No.: US 6,451,232 B2
(45) Date of Patent: *Sep. 17, 2002

(54) METHOD FOR FORMING HEADLINERS

(75) Inventors: Scott A. Barber, Plymouth; John C. Walters, Flat Rock; Brian H. Scholfield, Canton, all of MI (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,054

(22) Filed: Mar. 25, 1999

(51) Int. Cl.⁷ .......................... B29C 44/06; B29C 44/12

(52) U.S. Cl. .................. 264/46.4; 264/252; 264/254

(58) Field of Search ............................... 264/46.4, 252, 264/254, 45.1

(56) References Cited

U.S. PATENT DOCUMENTS

| | | | | |
|---|---|---|---|---|
| 3,911,190 A | * | 10/1975 | Myers et al. ............. | 264/46.5 |
| 4,052,241 A | | 10/1977 | Walter | |
| 4,077,821 A | * | 3/1978 | Doerfling .................. | 264/46.5 |
| 4,093,411 A | | 6/1978 | Lee | |
| 4,256,797 A | | 3/1981 | Stamper et al. | |
| 4,443,286 A | | 4/1984 | Ikeda et al. | |
| 4,636,425 A | | 1/1987 | Johnson et al. | |
| 4,714,575 A | * | 12/1987 | Preston ..................... | 264/46.4 |
| 4,810,316 A | | 3/1989 | Wakabayashi et al. | |
| 4,871,612 A | | 10/1989 | Okina et al. | |
| 4,881,997 A | | 11/1989 | Hatch | |
| 4,952,351 A | * | 8/1990 | Parker et al. ............. | 264/46.5 |
| 5,000,515 A | * | 3/1991 | DeView ..................... | 264/45.1 |
| 5,026,586 A | | 6/1991 | Tabor | |
| 5,082,716 A | | 1/1992 | Satterfield et al. | |
| 5,089,328 A | | 2/1992 | Doerer et al. | |
| 5,112,542 A | | 5/1992 | Beer | |
| 5,132,063 A | | 7/1992 | Hughes | |
| 5,273,698 A | | 12/1993 | Thary | |
| 5,292,476 A | * | 3/1994 | Jones ......................... | 264/46.6 |
| 5,296,182 A | | 3/1994 | Thary | |
| 5,312,848 A | * | 5/1994 | Klapper et al. ............ | 264/46.4 |
| 5,324,462 A | | 6/1994 | Rohn | |
| 5,344,208 A | | 9/1994 | Bien et al. | |
| 5,387,390 A | * | 2/1995 | Kornylo .................... | 264/46.4 |
| 5,389,317 A | | 2/1995 | Grimmer | |
| 5,389,318 A | | 2/1995 | Thary | |
| 5,411,688 A | * | 5/1995 | Morrison ................... | 264/46.4 |
| 5,512,233 A | | 4/1996 | Gallagher et al. | |
| 5,580,501 A | | 12/1996 | Gallagher et al. | |
| 5,582,789 A | | 12/1996 | Stein et al. | |
| 5,582,906 A | | 12/1996 | Romesberg et al. | |

(List continued on next page.)

FOREIGN PATENT DOCUMENTS

| | | |
|---|---|---|
| DE | 197 54 180 A | 6/1998 |
| DE | 198 18 881 A | 11/1998 |
| EP | 0 057 886 A1 | 8/1982 |
| EP | 0 137 125 A2 | 4/1985 |
| EP | 0 251 267 A1 | 1/1988 |
| EP | 0 296 446 A2 | 12/1988 |
| EP | 0 393 476 A1 | 10/1990 |
| EP | 0 714 760 A | 6/1996 |
| EP | 0 720 902 A | 7/1996 |
| JP | 5-8234 * | 1/1993 ............... 264/46.4 |

*Primary Examiner*—Allan R. Kuhns
(74) *Attorney, Agent, or Firm*—Brooks & Kushman P.C.

(57) ABSTRACT

A method for forming a headliner assembly includes forming a main body having a periphery, and a shape corresponding to a desired shape of the headliner assembly; positioning the main body in a mold having a recess; closing the mold; and injecting foam into the recess to simultaneously form an energy absorbing member and join the energy absorbing member to the main body proximate the periphery of the main body.

42 Claims, 3 Drawing Sheets

U.S. PATENT DOCUMENTS

| | | | |
|---|---|---|---|
| 5,637,389 A | * 6/1997 | Colvin et al. | 264/46.5 |
| 5,641,564 A | 6/1997 | Thary | |
| 5,679,301 A | 10/1997 | Miklas et al. | |
| 5,683,796 A | 11/1997 | Kornylo et al. | |
| 5,700,050 A | 12/1997 | Gonas | |
| 5,721,038 A | 2/1998 | Kornylo et al. | |
| 5,736,082 A | 4/1998 | Funato et al. | |
| 5,756,189 A | 5/1998 | Nagano et al. | |
| 5,804,292 A | 9/1998 | Ishitoya et al. | |
| 5,811,053 A | * 9/1998 | Ota et al. | 264/254 |
| 5,837,172 A | * 11/1998 | Pritchard et al. | 264/46.4 |
| 5,840,224 A | 11/1998 | Thary | |
| 5,845,458 A | 12/1998 | Patel | |
| 5,989,699 A | * 11/1999 | Kuczynski et al. | 264/46.6 |

* cited by examiner

METHOD FOR FORMING HEADLINERS

TECHNICAL FIELD

The invention relates to a method for forming headliners having energy absorbing members.

BACKGROUND ART

A prior method of making a headliner assembly having energy absorbing members, such as head impact pads, attached thereto includes forming the pads separately from the headliner. The pad forming process includes molding a block of foam, cutting the block into rectangular panels, die-cutting the panels, and compression molding the panels to form the pads. The pads are then attached to a preformed headliner using assembly dies and an adhesive. Because of the multiple steps involved with forming the pads and attaching the pads to the headliner, this method is time consuming and costly. Furthermore, because the pads are die-cut from rectangular panels, this method also results in significant waste.

U.S. Pat. No. 5,845,458 discloses another method of making a headliner having deformable foam inserts disposed on side edges of the headliner. The method includes positioning a cover layer, a foam panel, and preformed rectangular foam inserts in a mold, and draping a flexible backing layer over the foam panel and foam inserts. Suitable adhesives are also positioned between the cover layer and the foam panel, and between the foam panel and the foam inserts. The mold is then closed to compression mold the foam panel and foam inserts, as well as to stiffen the backing layer. Similar to the above method, however, this method involves multiple steps for forming the inserts and attaching the inserts to the remainder of the headliner.

DISCLOSURE OF INVENTION

The invention overcomes the shortcomings of the prior art by providing a method for forming a headliner assembly that includes simultaneously forming an energy absorbing member and joining the energy absorbing member to a main body of the headliner assembly. Consequently, the method of the invention significantly reduces time and manufacturing costs compared with prior methods.

Accordingly, it is an object of the invention to provide a method for forming a headliner assembly having an energy absorbing member joined to a main body, wherein the energy absorbing member is molded directly onto the main body.

Under the invention, a method for forming a headliner assembly includes forming a main body having a periphery, and a shape corresponding to a desired shape of the headliner assembly; positioning the main body in a mold having a recess; closing the mold; and injecting foam into the recess to simultaneously form an energy absorbing member and join the energy absorbing member to the main body proximate the periphery of the main body.

Furthermore, by using a mold having multiple recesses, a headliner assembly may be formed with multiple energy absorbing members. According to a feature of the invention, foam may be injected into one recess with a first injection density, and foam may be injected into another recess with a second injection density different than the first injection density so as to form two energy absorbing members having different densities.

These and other objects, features and advantages of the invention are readily apparent from the following detailed description of the best mode for carrying out the invention when taken in conjunction with the accompanying drawings.

BEST MODE FOR CARRYING OUT THE INVENTION

Figure 1:
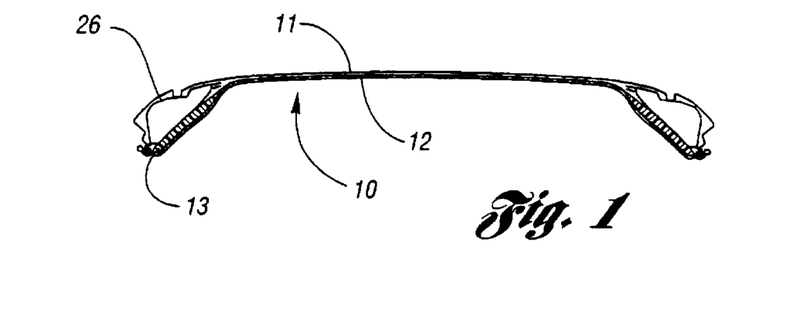
FIG. 1 is a transverse sectional view of a headliner assembly according to the present invention.
Figure 3:
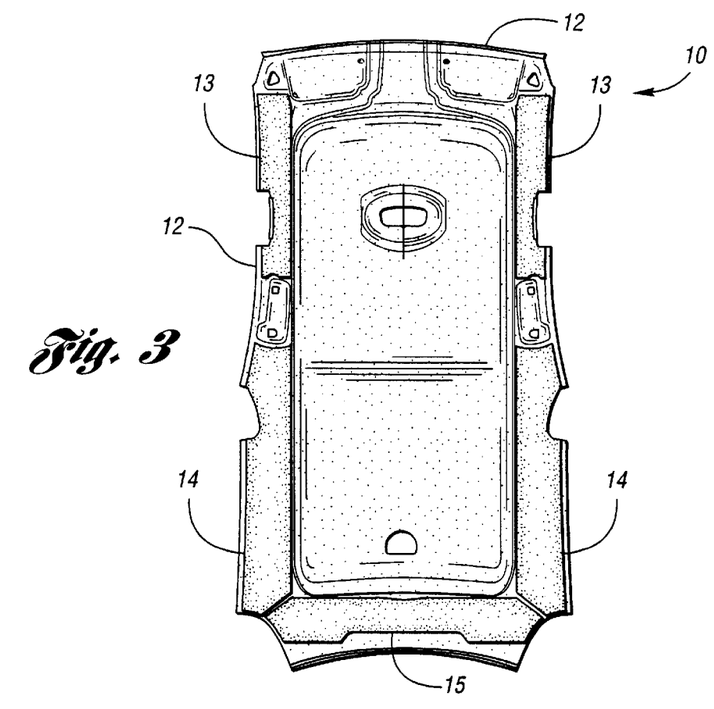
FIG. 3 is a top view of the headliner assembly showing multiple energy absorbing members attached to a main body of the headliner assembly.

FIGS. 1 and 3 show a headliner assembly 10, according to the invention, adapted to be mounted to a roof 11 of a motor vehicle. The headliner assembly 10 includes a main body 12 and a plurality of energy absorbing members, such as head impact pads 13, 14 and 15, disposed along the periphery of the main body 12. The main body 12 has a first or backing layer 16, a second or substrate layer 18 and a cover layer 20. The backing layer 16 is preferably a relatively stiff, semi-flexible scrim layer, and has a first or upper surface 22 that is disposable proximate the roof 11 of the vehicle, and a second or lower surface 24. The substrate layer 18 is attached to the lower surface of the backing layer 16, such as with an adhesive. While the substrate layer 18 may comprise any suitable material, in a preferred embodiment the substrate layer 18 preferably comprises a thermoformable rigid urethane layer sandwiched between two fiberglass layers. The cover layer 20 may be any suitable cover material, such as cloth or vinyl provided with or without a padding layer, and the cover layer 20 is attached to the substrate layer 18 such as with an adhesive. Alternatively, the headliner assembly 12 may be manufactured without a backing layer 16 and/or a cover layer 20 if not required for a particular application.

Figure 2:
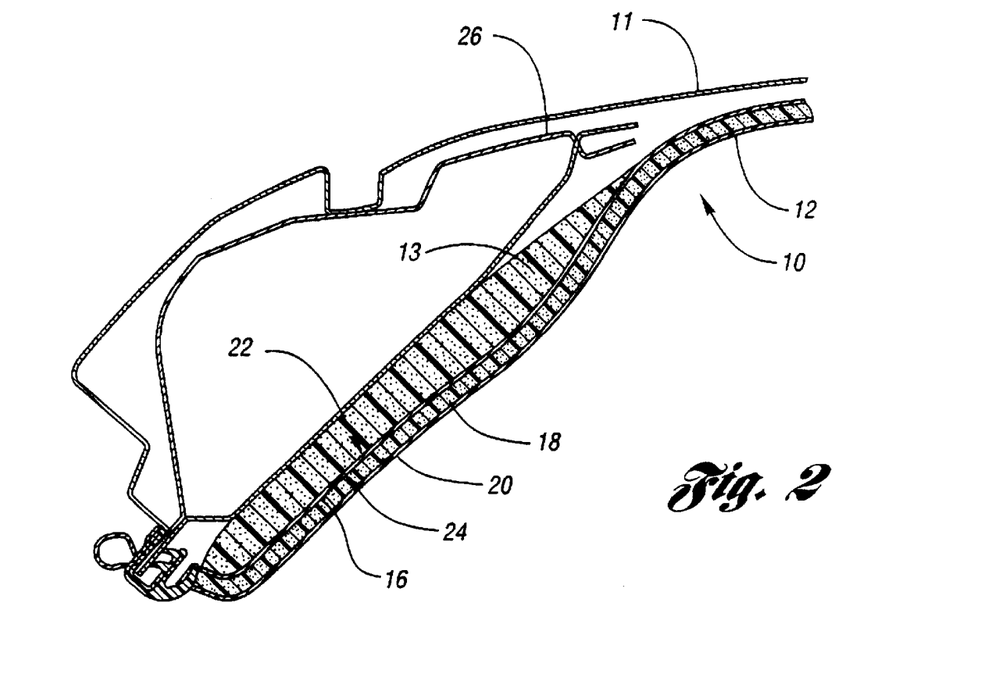
FIG. 2 is an enlarged fragmentary sectional view of the headliner assembly of FIG. 1.

The head impact pads 13, 14 and 15 are disposed proximate peripheral portions of the roof 11 when the headliner assembly 10 is mounted to the roof 11. For example, as shown in FIGS. 1 and 2, the pads 13 are disposed proximate side rails 26 of the roof 11 when the headliner assembly 10 is mounted to the roof 11, such that the pads 13 are engaged with the side rails 26. Similarly, although not shown in the drawings, the pads 14 are also disposed proximate the side rails 26, and the pad 15 is disposed proximate a rear portion of the roof 11 when the headliner assembly 10 is mounted to the roof 11. Obviously, the number of pads, and the size and shape of each pad may be varied depending on the application. For example, the rear pad 15 may be eliminated if not required, or the pads 13, 14 and 15 may be configured as a single, continuous pad. The pads 13, 14 and 15 are made of a deformable foam that is capable of absorbing impact energy. While the foam may comprise any suitable material, in a preferred embodiment the foam comprises a mixture of isocyanate and resin, which is available from BASF Corporation of Wyandotte, Mich. Advantageously, the pads 13, 14 and 15 are molded directly onto the backing layer 16 such that the pads 13, 14 and 15 are simultaneously formed and joined to the backing layer 16 in a single operation, which is described below in greater detail. Alternatively, the pads 13, 14 and 15 may be molded directly onto the substrate layer 18 if the backing layer 16 is eliminated.

Figure 4:
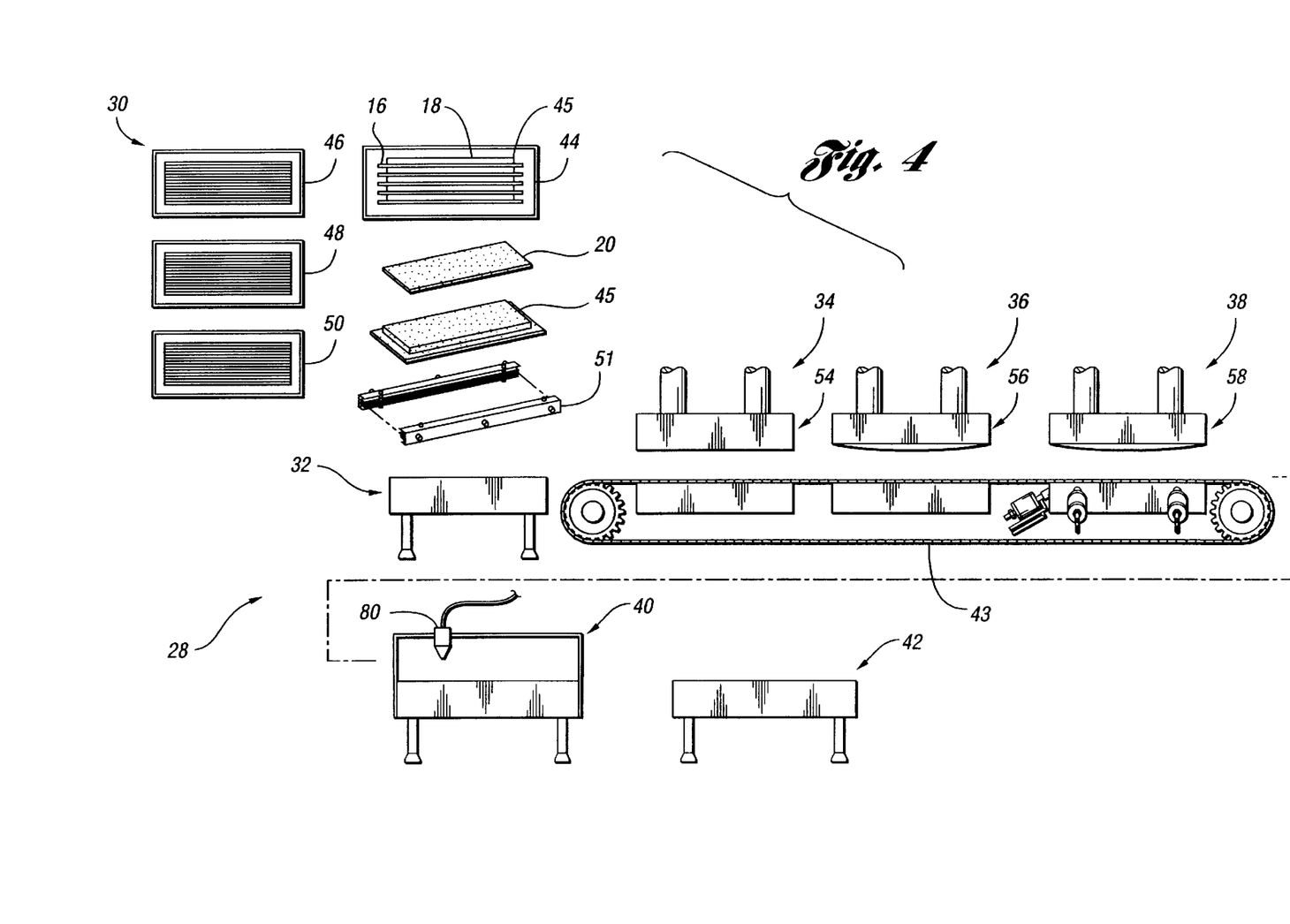
FIG. 4 is a schematic view of a production-line arrangement for manufacturing the headliner assembly.

FIG. 4 shows a production-line arrangement 28 according to the invention for forming the headliner assembly 10. The production-line arrangement 28 includes a component storage area 30, a loading station 32, a heating station 34, a forming station 36, a foam-in-place molding station 38, a cutting station 40, and a fixture installation station 42. The production-line arrangement 28 further includes a conveyor system 43, such as a chain conveyor, for transporting components between the loading station 32, the heating station 34 and the forming station 36.

Figure 5:
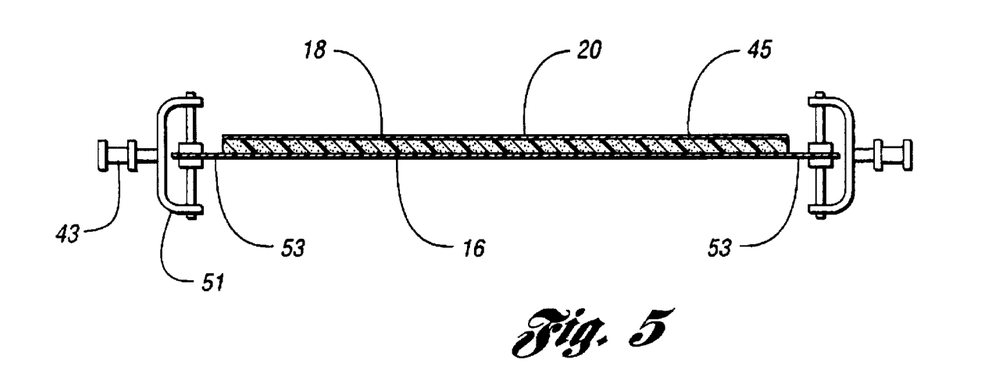
FIG. 5 is a cross-sectional view of a blank used to manufacture the headliner assembly, wherein the blank is supported by a frame.

The component storage area 30 preferably includes a source 44 of blanks 45, wherein each blank 45 comprises a substrate layer 18 with a backing layer 16 attached thereto. The component storage area 30 further includes a plurality of sources 46, 48 and 50 of cover layers, wherein each cover layer source 46, 48 and 50 contains cover layers that are different in color and/or composition compared with another of the cover layer sources 46, 48 and 50. At loading station 32, a blank 45 and a particular cover layer 20 selected from one of the cover layer sources 46, 48 and 50 are positioned in a frame 51, which is then mounted on the conveyor system 43. An adhesive layer may also be positioned between the blank 45 and the cover layer 20. As shown in FIG. 5, the backing layer 16 of the blank 45 preferably has an extended portion 53 that extends beyond the substrate layer 18 of the blank 45. Preferably, the frame 51 grips the extended portion 53 to thereby support the blank 45 and the cover layer 20 on the conveyor system 43. Consequently, the substrate layer 18 of the blank 45 can be appropriately sized to closely match the final size or outline of the headliner assembly 10, to thereby reduce scrap or waste material compared with prior methods of forming headliners. Alternatively, a conveyor system may be provided with upper and lower chains that grip the extended portion 53 therebetween. The blank 45 and the cover layer 20 are then transferred by the conveyor system 43 to the heating station 34 shown in FIG.

The heating station 34 includes a platen assembly 54 having upper and lower heated platens that engage the blank 45 and the cover layer 20 to thereby heat the blank 45 and the cover layer 20. The platen assembly 54 also has a plurality of thermocouples for sensing temperature of the blank 45 and the cover layer 20. Once sufficiently heated, the blank 45 and the cover layer 20 are transferred by the conveyor system 43 to the forming station 36.

The forming station 36 includes a first mold 56 having first and second mold portions for thermoforming the blank 45 and the cover layer 20 to thereby form the main body 12, such that the main body 12 has a shape that corresponds to a desired shape of the headliner assembly 10. Preferably, both mold portions are chilled in any suitable manner, such as by circulating chilled water through the mold portions. The forming station 36 preferably includes multiple molds, similar to the first mold 56, that can be alternated between to form various headliner shapes and sizes. The main body 12 is then transported manually or otherwise to the foam-in-place molding station 38.

Figure 6:
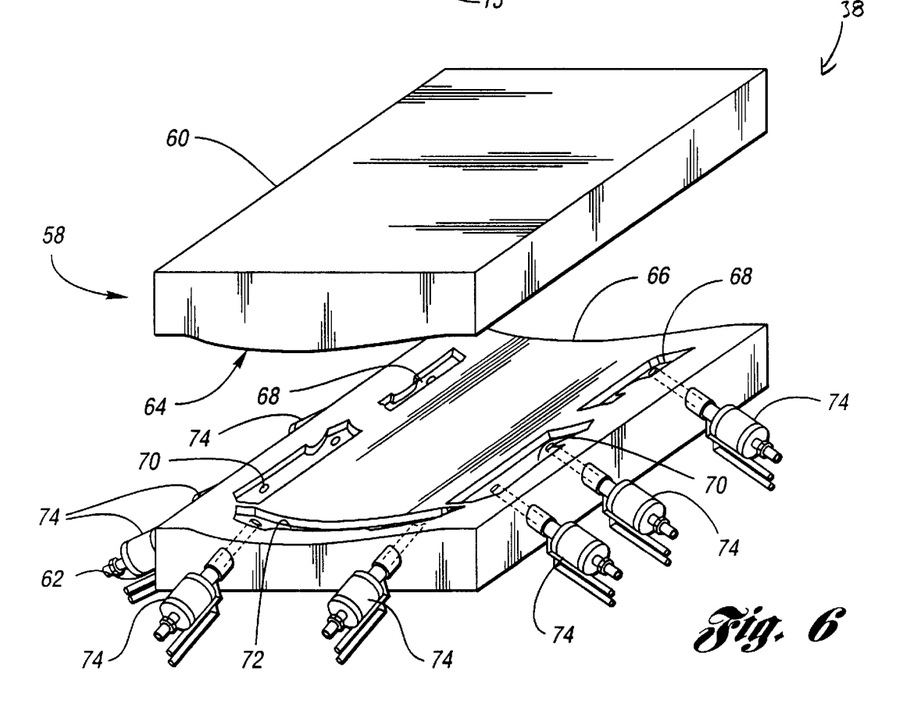
FIG. 6 is a perspective view of a mold having a plurality of recesses for forming the energy absorbing members.

The foam-in-place molding station 38 includes a second mold 58 for forming the pads 13, 14 and 15 on the main body 12, to thereby form the headliner assembly 10. The foam-in-place molding station 38 preferably includes multiple molds similar to the second mold 58 for forming various pad configurations on various headliner configurations. As shown in FIG. 6, the mold 58 includes a first or upper mold portion 60, and a second or lower mold portion 62. The upper mold portion 60 has a mold surface 64 that corresponds with the formed shape of the cover layer 20, or the formed shape of a surface of the main body 12 to which the cover layer 20 is attached. The lower mold portion 62 has a mold surface 66 that corresponds with the formed shape of the backing layer 16 of the main body 12. Thus, preferably no additional shaping of the main body 12 occurs at molding station 38. The lower mold portion 62 further includes a plurality of cavities or recesses 68, 70 and 72 for respectively forming the pads 13, 14 and 15. Each of the recesses 68, 70 and 72 is in fluid communication with one or more pour heads 74 that inject or otherwise introduce foam into the particular recess 68, 70 and 72. For example, as shown in FIG. 6, each of the recesses 68 is in fluid communication with a single pour head 74, and each of the recesses 70 and 72 is in fluid communication with two pour heads 74. The pour heads 74 are connected to one or more sources of foam (not shown), such as a mixture of isocyanate and resin. Alternatively, the foam may comprise any suitable deformable material.

At molding station 38, the formed main body 12 is positioned between the mold portions 60 and 62, and the mold portions 60 and 62 are closed together. Next, foam is preferably sequentially injected by the pour heads 74 into the recesses 68, 70 and 72. Because foam injected into the larger recesses 70 and 72 requires more time to expand and cure than foam injected into the smaller recesses 68, foam is preferably first injected into the recesses 70 and 72, and subsequently into the recesses 68. As a result, expansion and curing of the foam can conclude in all of the recesses 68, 70 and 72 at approximately the same time. The lower mold portion 62 is also preferably heated in the range of 130° F. to 190° F. to assist in the expansion and curing process of the foam, and to flash off water that may be associated with a mold-release agent. The multiple pour heads 74 feeding a particular one of the larger recesses 70 and 72 preferably inject foam simultaneously, or in closely spaced stages, into the particular one of the recesses 70 and 72 so as to provide relatively consistent foam characteristics throughout the particular one of the recesses 70 and 72. Alternatively, foam may be injected simultaneously into two or more of the recesses 68, 70 and 72.

Because the recesses 68, 70 and 72 may be separated from each other, the quantity or mass of foam per unit of recess volume delivered by the pour heads 74, which is referred to as injection density of the pour heads 74, can be varied from one of the recesses 68, 70 and 72 to another of the recesses 68, 70 and 72 so as to vary the density of the resultant pads 13, 14 and 15. For example, a larger quantity of foam per unit of recess volume can be delivered to the recesses 68, as compared with the recesses 70 and 72, such that the resultant pads 13 have a greater density than the resultant pads 14 and 15. In one embodiment of the headliner assembly 10, the pads 13 have a density of about 4.0 pounds per cubic foot, while the pads 14 and 15 have a density of about 3.5 pounds per cubic foot. Consequently, foam density can be increased in areas requiring greater energy absorbing properties, such as areas of the headliner assembly 10 that will be aligned with side rail and A-pillar joints of a motor vehicle. Furthermore, foam densities can be decreased in areas requiring less energy absorbing properties. Thus, overall material costs can be significantly reduced compared with prior methods that involve remotely forming pads having the same or similar densities. Alternatively, different foam compositions may be used under the method according to the invention to form pads having different densities.

Because the pads 13, 14 and 15 are formed with the mold 58 that is specifically designed for a particular headliner configuration and a particular roof configuration, the pads 13, 14 and 15 may be precisely formed to achieve relatively close design tolerances. Because the pads 13, 14 and 15 are simultaneously formed and joined to the main body 12, this method involves significantly fewer steps and less equipment and tooling than prior methods that involve separately forming head impact pads using multiple molds, checking the configuration of the pads using multiple check fixtures, and attaching the pads to preformed headliners using adhesives. Furthermore, because pads are not individually handled and stored, this method involves lower inventory and part handling costs compared with prior methods. As a result, manufacturing costs are significantly reduced under this method. For example, it is estimated that tooling costs alone for forming and joining pads to preformed headliners may be reduced by approximately 40% compared with prior methods that utilize separate tools to form pads and then attach the pads to preformed headliners.

Next, the headliner assembly 10 is transferred to the cutting station 40, which is shown in FIG. 4. The cutting station 40 preferably includes a computer controlled, water jet cutting device 80 for trimming the headliner assembly 10 and/or for cutting openings through the headliner assembly 10. As previously mentioned, because the size of the substrate layer 18 is preferably closely matched to the final size or outline of the headliner assembly 10, the amount of trimming required is significantly reduced compared with prior methods of forming headliners. The headliner assembly 10 is then transferred to the fixture assembly station 42 where installation of such fixtures as coat hooks, dome lights, wire harnesses, etc. is completed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for forming a headliner assembly, the method comprising:
    forming a main body having a periphery and a shape corresponding to a desired shape of the headliner assembly;
    then positioning the main body in a mold having a recess;
    closing the mold; and
    injecting foam into the recess using multiple pour heads, after the step of closing the mold, to simultaneously form an energy absorbing member on the main body proximate the periphery of the main body and join the energy absorbing member to the main body.

2. The method of claim 1 wherein the step of injecting foam comprises sequentially injecting foam from first and second pour heads.

3. The method of claim 1 wherein forming a main body includes:
    positioning first and second layers between first and second mold portions, wherein the first layer has an extended portion that extends beyond the second layer;
    gripping the extended portion of the first layer to support the first and second layers between the mold portions;
    moving one of the mold portions toward the other mold portion to shape the layers and join the layers together.

4. The method of claim 1 wherein the step of injecting foam comprises injecting isocyanate into the recess.

5. The method of claim 1 wherein the step of injecting foam comprises isocyanate and resin into the recess.

6. The method of claim 1 wherein forming a main body includes:
    positioning a blank and a cover layer between first and second mold portions, wherein the blank includes a thermoformable rigid urethane layer; and
    moving one of the mode portions toward the other mold portion to shape the blank and the cover layer and join the blank and the cover layer together.

7. The method of claim 6 wherein the blank further includes two fiberglass layers, and the urethane layer is sandwiched between the fiberglass layers.

8. The method of claim 1 wherein no additional shaping of the main body occurs in the mold into which the foam is injected.

9. The method of claim 1 wherein the main body has a central portion that is surrounded by the periphery, and the energy absorbing member does not extend over the central portion.

10. A method for forming a headliner assembly for use with a motor vehicle having a roof, the method comprising:
    forming a main body having a central portion, a periphery that surrounds the central portion, and a shape corresponding to a desired shape of the headliner assembly, wherein the central portion is positionable adjacent the roof when the headliner assembly is mounted to the vehicle;
    positioning the main body in a mold having multiple recesses;
    closing the mold; and
    injecting foam into the recesses and onto the main body after the step of closing the mold to form multiple energy absorbing members proximate the periphery of the main body;
    wherein the step of injecting foam includes injecting foam into one recess using multiple pour heads, and wherein each energy absorbing member is positionable between the main body and the roof when the headliner assembly is mounted to the vehicle.

11. The method of claim 10 wherein the step of injecting foam comprises injecting foam into the one recess at a first injection density and injecting foam into another recess at a second injection density different than the first injection density so as to form two energy absorbing members having different densities.

12. The method of claim 10 wherein the step of injecting foam comprises injecting a first foam into the one recess and injecting a second foam different than the first foam into another recess so as to form two energy absorbing members having different foam compositions.

13. The method of claim 10 wherein the step of injecting foam comprises injecting isocyanate into the recesses.

14. The method of claim 10 wherein the step of injecting foam comprises injecting isocyanate and resin into the recesses.

15. The method of claim 10 wherein the step of injecting foam comprises sequentially injecting foam into the recesses such that foam is injected first into the one recess and then into another recess.

16. The method of claim 10 wherein the recesses are spaced away from each other, and the step of injecting foam comprises injecting foam into the recesses and onto the main body to form multiple spaced energy absorbing members proximate the periphery of the main body.

17. The method of claim 10 wherein forming a main body includes:
   positioning a blank and a cover layer between first and second mold portions, wherein the blank includes a thermoformable rigid urethane layer; and
   moving one of the mold portions toward the other mold portion to shape the blank and the cover layer and join the blank and the cover layer together.

18. The method of claim 17 wherein the blank further includes two fiberglass layers, and the urethane layer is sandwiched between the fiberglass layers.

19. The method of claim 10 wherein no additional shaping of the main body occurs in the mold into which the foam is injected.

20. The method of claim 10 wherein the energy absorbing members are formed such that none of the energy absorbing members extend over the central portion of the main body.

21. A method for forming a headliner assembly, the method comprising:
   forming, using a first mold, a main body having a shape corresponding to a desired shape of the headliner assembly, the main body including a backing layer, a substrate layer, and a cover layer, wherein the substrate layer is sandwiched between the backing layer and the cover layer, and wherein the backing layer has first and second surfaces, the second surface being attached to the substrate layer;
   positioning the formed main body between two mold portions of a second mold that is different than the first mold, one of the mold portions having first and second recesses;
   closing the second mold;
   injecting foam into the first recess at a first injection density to form a first energy absorbing member on the first surface of the backing layer; and
   injecting foam into the second recess at a second injection density different than the first injection density to form a second energy absorbing member on the first surface of the backing layer;
   wherein the first and second energy absorbing members have different densities.

22. The method of claim 21 wherein the substrate layer includes a thermoformable rigid urethane layer.

23. The method of claim 19 wherein the substrate layer further includes tow fiberglass layers, and the urethane layer is sandwiched between the fiberglass layers.

24. The method of claim 21 wherein the step of injecting foam into the first recess comprising injecting isocyanate into the first recess, and wherein the step of injecting foam into the second recess comprises injecting isocyanate into the second recess.

25. The method of claim 21 wherein the step of injecting foam into the first recess comprises injecting isocyanate and resin into the first recess, and wherein the step of injecting foam into the second recess comprises injecting isocyanate and resin into the second recess.

26. The method of claim 21 wherein the recesses are spaced away from each other such that the energy absorbing members are formed as discrete energy absorbing members that are spaced away from each other with no foam extending between the energy absorbing members.

27. The method of claim 21 wherein no additional shaping of the main body occurs in the second mold.

28. The method of claim 21 wherein the main body has a central portion and a periphery that surrounds the central portion, and wherein the energy absorbing members are formed such that the energy absorbing members do not extend over the central portion.

29. A method for forming a headliner assembly, the method comprising:
   forming a main body having a periphery and a shape corresponding to a desired shape of the headliner assembly;
   then positioning the main body in a mold having multiple recesses;
   closing the mold;
   injecting foam into one recess at a first injection density so as to form a first energy absorbing member on the main body proximate the periphery of the main body; and
   injecting foam into another recess at a second injection density so as to form a second energy absorbing member on the main body proximate the periphery of the main body, such that the second energy absorbing member has a different density than the first energy absorbing member.

30. The method of claim 29 wherein forming a main body includes:
   positioning a blank and a cover layer between first and second mold portions, wherein the blank includes a thermoformable rigid urethane layer; and
   moving one of the mold portions toward the other mold portion to shape the blank and the cover layer and join the blank and the cover layer together.

31. The method of claim 30 wherein the blank further includes two fiberglass layers, and the urethane layer is sandwiched between the fiberglass layers.

32. The method of claim 29 wherein the step of injecting foam into one recess comprises injecting isocyanate into the one recess, and wherein the step of injecting foam into another recess comprises injecting isocyanate into the another recesses 33. The method of claim 29 wherein the step of injecting foam into the one recess comprises injecting isocyanate and resin into the one recess, and wherein the step of injecting foam into another recess comprises injecting isocyanate and resin into the another recess.

34. The method of claim 29 wherein the recesses are spaced away from each other such that the first and second energy absorbing members are formed as discrete energy absorbing members that are spaced away from each other with no foam extending between the energy absorbing members.

35. The method of claim 29 wherein no additional shaping of the main body occurs in the mold into which the foam is injected.

36. The method of claim 29 wherein the main body has a central portion that is surrounded by the periphery, and wherein the energy absorbing members are formed such that neither the first energy absorbing member nor the second energy absorbing member extends over the central portion of the main body.

37. A method for forming a headliner assembly, the method comprising:
   forming a main body having a periphery and a shape corresponding to a desired shape of the headliner assembly;

the positioning the main body in a mold having multiple recesses;

closing the world;

injecting a first foam into one recess so as to form a first energy absorbing member on the main body proximate the periphery of the main body; and injecting a second foam into another recess so as to form a second energy absorbing member on the main body proximate the periphery of the main body, such that the second energy absorbing member has a different foam composition than the first energy absorbing member.

38. The method of claim 37 wherein forming a main body includes:

positioning a blank and a cover layer between first and second mold portions, wherein the blank includes a thermoformable rigid urethane layer; and moving one of the mold portions toward the other mold portion to shape the blank and the cover layer and join the blank and the cover layer together.

39. The method of claim 38 wherein the blank further includes two fiberglass layers, and the urethane layer is sandwiched between the fiberglass layers.

40. The method of claim 37 wherein the recesses are spaced away from each other such that the first and second energy absorbing members are formed as discrete energy absorbing members that are spaced away from each other with no foam extending between the energy absorbing members.

41. The method of claim 37 wherein no additional shaping of the main body occurs in the mold into which the foam is injected.

42. The method of claim 37 wherein the main body has a central portion that is surrounded by the periphery, and wherein the energy absorbing members are formed such that neither the first energy absorbing member nor the second energy absorbing member extends over the central portion of the main body.

* * * * *

UNITED STATES PATENT AND TRADEMARK OFFICE
CERTIFICATE OF CORRECTION

PATENT NO. : 6,451,232 B2
DATED : September 17, 2002
INVENTOR(S) : Scott A. Barber et al.

It is certified that error appears in the above-identified patent and that said Letters Patent is hereby corrected as shown below:

Column 6,
Line 6, after "comprises" and before "isocyanate" insert -- injecting --.
Line 12, delete "mode" and insert -- mold -- therefor.

Column 7,
Line 48, delete "19" and insert -- 22 -- therefor.
Line 49, delete "tow" and insert -- two -- therefor.

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,451,232 B2
DATED        : September 17, 2002
INVENTOR(S)  : Barber et al.

It is certified that error appears in the above-identified patent and that said Letters Patent is hereby corrected as shown below:

Column 9,
Line 3, delete "world" and insert -- mold -- therefor.

Signed and Sealed this

First Day of July, 2003

JAMES E. ROGAN
*Director of the United States Patent and Trademark Office*